March 12, 1968  C. E. LINDENMAYER  3,372,729
DRAPERIES AND DRAPERY MATERIAL
Filed Sept. 22, 1965
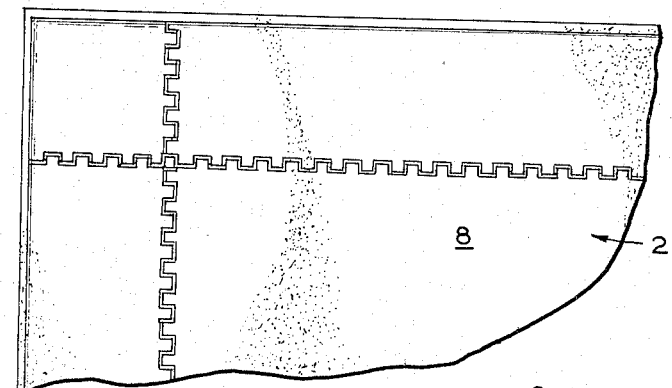
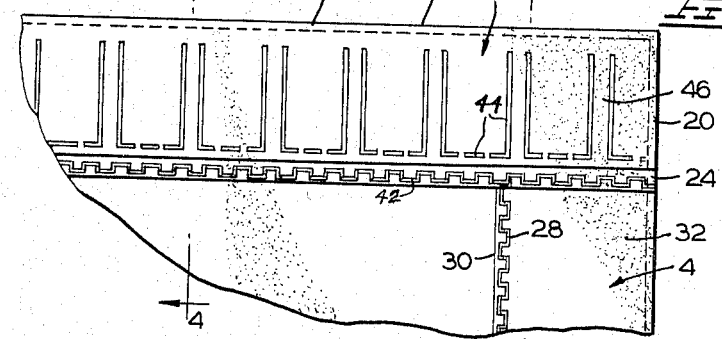
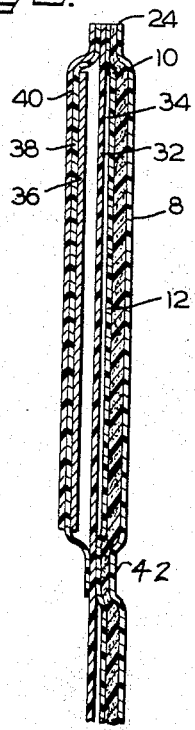
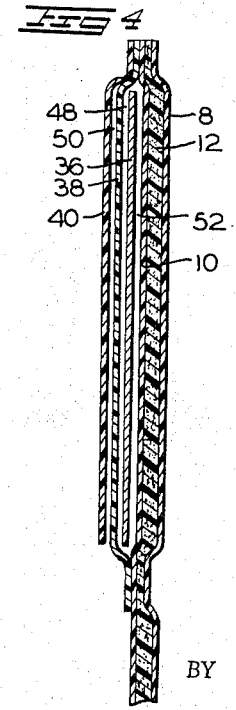
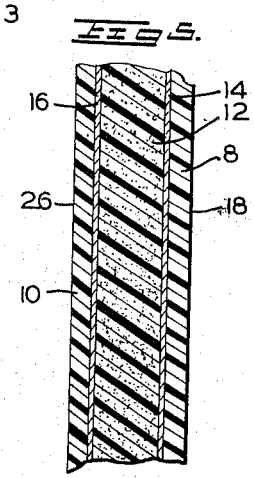
INVENTOR
CARL E. LINDENMAYER
BY Kemon, Palmer, Stewart + Estabrook
ATTORNEYS 2,372,729
Patented Mar. 12, 1968

3,372,729
DRAPERIES AND DRAPERY MATERIAL
Carl E. Lindenmayer, 1501 Jennie Scher Road,
P.O. Box 7677, Richmond, Va. 23231
Filed Sept. 22, 1965, Ser. No. 489,297
7 Claims. (Cl. 160—330)

ABSTRACT OF THE DISCLOSURE

Decorative draperies having high insulation properties so they may serve as efficient heat barriers for windows and other building openings are formed of a sandwich of a pair of outer flexible plastic films and an intermediate layer of resilient flexible foam having a thickness about 2.5 to 500 times the thickness of the front plastic film of the drapery.

Background of the invention

Modern building construction makes extensive use of large windows and glass or transparent plastic doors. In many instances, the entire side wall of a room in a private residence or office building may be formed of a glass or transparent plastic panel. Such windows, walls or similar transparent openings, although desirable for esthetic and light transmission purposes, present serious problems with respect to heat transfer. Thus, in northern climates in cold weather, much heat from the interior of the building can be lost through such glass windows. Conversely, in southern climates, particularly those with southern exposures, the heat input to a building through such openings can be troublesome. The direct rays of sun entering a building through large size glass windows can impose a great heat load on air conditioning systems or can rapidly deteriorate the finish on furniture, and damage or fade wall and floor coverings. Accordingly, there is a need, particularly in connection with modern building design using extensive glass windows or other transparent exterior surfaces, for efficient means to provide movable heat barriers to reduce transfer of heat across the windows or other openings in the building without interfering with the desired transparency feature of the window.

A principal object of the present invention is the provision of new improvements in draperies and drapery material. Further objects include:

(1) The provision of new improvements in plastic drapery construction.

(2) The provision of plastic draperies of a construction that are highly effective in preventing heat loss across windows or other building openings in northern climates.

(3) The provision of new forms of draperies capable of installation and use in windows and other transparent openings of buildings to reduce the heat load on air conditioning systems in southern climates.

(4) The provision of drapery material formed of flexible plastic film which may serve as highly efficient heat barriers for windows and other transparent building openings.

(5) The provision of draperies made principally of non-fibrous material complete with support rod receiving channels or other means for hanging the drapery on support rods having a back surface highly reflective to incident light and heat rays and incorporating a thermal insulation layer.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Summary of the invention

These objects are accomplished according to the present invention by the formation of draperies, particularly decorative window draperies, which may be drawn across a window to provide an efficient barrier against heat transfer through the window or the like which comprises flexible heat barrier sheet material in the form of a lamination of three plastic or elastomeric layers, namely, a front layer of flexible non-fibrous plastic film about 1–20 mils in thickness, an intermediate layer of resilient flexible foam material of thickness of about 2.5 to 500 times the thickness of the front layer and a back layer of flexible non-fibrous plastic film about 1–20 mils in thickness, the back layer comprising sufficient heat reflective material to render the plastic film reflective to a major portion of radiant energy incident upon the plastic film.

Advantageously, the front and back layers of the laminated heat barrier sheet material of which the drapery is formed will consist of plasticized vinyl ester film of about 1–20 mils in thickness with the exposed surface of the front layer being decorated by printing thereon and the back layer of plastic film will comprise between about 1–10% by weight of heat reflective pigment, preferably heat reflective aluminum metal pigment.

Advantageously, the intermediate layer is formed of a sheet of polyurethane foam having a thickness of about 50–500 mils. A white foam has been found to give best results. Excellent drape in the products is obtained with a foam of about $\frac{1}{10}$ inch thickness with front and back films of about 5 mils thickness.

A more complete understanding of the new draperies and drapery materials of the invention and the details of their construction may be had by reference to the accompanying drawings in which:

FIGURE 1 is a fragmentary front view of the upper left-hand corner of a drapery constructed in accordance with the invention.

FIGURE 2 is a fragmentary view of the back side of the upper left-hand corner of the drapery as shown in FIGURE 1.

FIGURE 3 is a fragmentary sectional view taken along the line 3—3 of FIGURE 2.

FIGURE 4 is a fragmentary sectional view taken along the line 4—4 of FIGURE 2.

FIGURE 5 is an enlarged fragmentary sectional view of new drapery material of the invention.

The drapery basically comprises laminated heat barrier material 2, edge elements 4 and support means 6.

The laminated heat barrier sheet material 2 comprises a front layer 8, a real layer 10 and an intermediate layer 12. This laminated sandwich is held together by a layer of adhesive 14 between the front layer 8 and intermediate layer 12 and a second layer of adhesive 16 between back layer 10 and the foam layer 12.

The front and back sheets 8 and 10 are preferably formed of non-fibrous plastic films having a thickness of about 1 to 10 mils. However, the use of non-woven fibrous webs and woven or knit fabrics to form front layer 8 and back layer 10 is contemplated by the invention.

Advantageously, the front and back films can be formed of polymers of vinyl esters which have been plasticized to provide compositions of relatively high tensile strength, good flexibility, and other desirable properties in accordance with commercial practices in the plastics art. Polyvinyl chloride, copolymers of polyvinyl chloride with polyvinyl acetate, polyvinylidene chloride and similar polyvinyl ester materials constitute a preferred class of polymers from which to form the plastic films for use as the front and back members of the flexible laminated heat barrier material 2. However, other non-fibrous plastic films known to the art possessing the requisite strength properties, resistance against flow under heat conditions to be encountered by the draperies in normal use and good flexibility under the temperature ranges to be encountered in the use of drapery materials can be employed. Films of polyolefins, particularly polyethylene and polypropylene, can be used. Plasticizers, particularly in the case of polyvinyl esters, can be employed, in accordance with the understandings of the plastics art, to provide the desired degree of flexibility, drape and other desired properties to the polymers in creating films for use as members 8 and 10. Such plasticizers include phthalic acid esters, e.g., dioctyl phthalate, dibutyl phthalate and the like, phosphate esters, e.g., dicresyl phosphate and the like, soy bean oil fatty esters and comparable plasticizers. Advantageously, the plastic film for the front layer 8 can be pigmented such as with about 1 to 25% of pigment such as titanium dioxide, zinc oxide, carbon black, calcium silicate, iron oxide, or comparable pigments in order to provide a desired ornamental coloration to the film which can, in case the front layer 8 is ornamented by overprinting, serve as a background for such printing or other ornamentation.

The back layer 10, which will be the portion of the drapery facing toward the outside of a building in normal installation of the drapery over a window contains a heat reflective pigment. Advantageously, such pigment can be aluminum metal pigment, particularly that type of aluminum pigment which is in microscopic flake form which, when applied as a coating in a resinous binder to a surface or incorporated in a film within a plastic matrix, creates a highly reflective surface or film. Other heat reflective pigments such as flake bronze, powdered mica or the like may be used.

Advantageously, about 1 to 10% by weight, based on the total weight of the backing film 10, of heat reflective pigment is employed. The pigment may be present as a dispersion in the polymer matrix of the non-fibrous film or as an ingredient in a lacquer or similar coating which has been applied to the exposed surface of the back film 10. In use of the new drapes formed in accordance with the invention, the heat reflective pigment serves to reflect a substantial percentage of the radiant energy which passes through the building opening across which the drapery is hung. This, in combination with the insulation provided by the foam intermediate layer 12, creates a drapery capable of efficiently preventing transfer of heat through the window or other building opening.

Intermediate layer of sponge or foam material 12 is advantageously formed of polyurethane foam which may be of the polyether or polyester type and produced and fabricated as a sheet of about 10 to 500 mils thickness by any suitable procedure known to the plastics art. If desired, heat resistant pigments or any other type of pigment material such as carbon black, titanium dioxide or the like may be included in the resilient sponge layer 12 either for strengthening, heat insulation or the like. It is further contemplated that similar foam or sponge-like materials may be used in constructing the new laminated sheet materials 2 in addition to polyurethane plastics, e.g., natural sponge rubber, foams of synthetic rubber, polyvinyl ester foams and comparable materials currently known to the plastics art or subsequently developed having insulation and strength properties comparable to polyurethane foams.

Any suitable adhesive or cement composition may be used as adhesive layers 14 and 16 to unite front and back webs 8 and 10 to the intermediate layer 12. Vinyl ester plastisol adhesive compositions suitable for adhesively uniting or cementing polyvinyl chloride films are commercially available and may advantageously be used in accordance with the invention. Rubber or synthetic rubber base adhesives, polyvinyl acetate adhesives or comparable adhesive materials may be used for this purpose. Furthermore, it is within the contemplation of the invention to form the laminated sheet material 2 without the use of adhesive layers 14 and 16 by creating adhesion between surface webs 8 and 10 and the intermediate layer 12 through controlled heat sealing or comparable manipulations known to the art of plastic film handling and fabrication.

The laminated heat barrier sheet material 2 constitutes a main feature of the present invention. With the use of such laminated sheet material, it is within the contemplation of the invention to form drapery and similar items by stitching, cementing, cutting and related operations well known to the drapery fabrication industry. Draperies may be so formed using heat barrier sheet materials 2 as illustrated in the enlarged sectional view of FIGURE 5.

Ornamental effects on the new drapery material, particularly ornamentation of the exposed surface 18 of the front layer 8 can be obtained by embossing, perforating or comparable figuring of the plastic film. A unique effect can be obtained by perforating or cutting the film 8 prior to lamination with the intermediate layer 12, in which case the color of the intermediate layer 12 will show through the openings in the film 8 forming color contrast in a polka-dot pattern or any other pattern into which the front film openings may be punched or cut.

An important feature of the present invention is the ability to form the completed draperies without need for stitching or related needling operations which would create perforations extending through the intermediate layer 12. Thus, it has been discovered that new forms of draperies can be created entirely by heat sealing operations and with the use of heat sealed edges and seams. A finished edge on both sides 20, top 22 and bottom (not shown) can be provided by a heat sealed edge or bead 24 in which the various plastic layers are effectively fused together and the intermediate sponge layer 12 is compressed.

Use of edge strips 4 at the sides and bottom of the drapery can provide additional strengthening and also serve to shape or attractively hold the drapery when hung at a window or otherwise installed in a building. The side or edging strips 4 may be formed of non-woven or knit fibrous fabric but, preferably, are formed of non-fibrous films comparable in weight, flexibility and the like to the films of which the front layer 8 and back layer 10 are fabricated. As illustrated in FIGURES 1 and 2, these edge strips 4 are incorporated in the new draperies by being heat sealed onto the back surface 26 of the back layer 10 with the edge sealing 24 and a parallel line of heat sealing 28 adjacent the other edge 30 of the plastic edge strip 32. The heat sealing 28 may be in the form of a straight line or, preferably, some form of zig-zag or wave line to give added strength and attractive appearance.

The support means 6 provided at the top of the drapery is advantageously formed by heat sealing added strips of sheet material in the manner illustrated in FIGURES 3 and 4. This means 6 is referred to as a drapery heading.

As seen in FIGURE 3, the plastic strip 32 of the side member 4 extends to the top edge of the drapery and forms a portion of the heat sealed bead 24, but is otherwise separated from the back layer 10 by an air space 34.

The support means 6 comprises a trio of strips 36, 38 and 40. The strips 38 and 40 are joined to the drapery at the heat sealed bead 24 and the parallel inner sealing line 42, which, advantageously, as in the case of heat seal line 28, is of zig-zag or wave form.

The inner strip 36 of the channel member 6 is preferably formed of non-woven fibrous material having high tear resistance and relative stiffness, e.g., a strip of nonwoven rayon fabric, cut to a width such that it extends almost to the heat sealed joints 24 and 42 without extending into them. On the other hand, this non-woven fibrous strip 36 joins to the back surface of plastic strip 38 at each of the vertical and horizontal heat sealed portions 44. This creates a series of vertical pockets 46 in the drapery heading 6. Two pronged drapery hooks are inserted into the base of pairs of these pockets to form pleats at desired locations along the drapery and permit it to be hung from drapery support rods which may be fed or attached upon drapery traverse rods. Single prong hooks may be used for other installations, or fabric and grommet constructions may be used to form the drapery heading.

The strips 38 and 40 are preferably made of nonfibrous plastic films of thickness and general composition comparable to the films used to form front layer 8, rear layer 10 and side strips 32. The strips 38 and 40 are fixed together along the heat sealed bead 24 and horizontally elongated heat sealing line 42. Also, strip 38 is united to sheet 10 along the heat sealed intermediate portions 44. Between these junctions, the strips 36 and 38 are separated by air space 48 and similarly strips 38 and 40 are separated by the air space 50.

The back section of the channel member 6 formed by strips 36, 38 and 40 joins to the other portion of the drapery only along the heat sealing bead 24 and heat seal line 42 leaving an air space 52 running clear through the channel means 6 from one side edge 20 of the drape to the other side edge.

Draperies in accordance with the invention as described above can be used with great advantage in the furnishing and decoration of homes, office buildings or the like, particularly buildings which have large glass windows, sliding door panels or similar transparent units of large cross-sectional area across which heat transfer may create problems in the heating or cooling of the building. The new drapery materials provide not only the normal decorative function, but also a movable thermal barrier for the windows or similar openings. Although these new draperies have a heat barrier efficiency many times greater than woven fabric draperies or similar drapery structures available heretofore, the new draperies may be hung, installed and otherwise handled and used with hardware and drapery fixtures and installation procedures employed heretofore. Hence, no special training or similar problems are encountered in their installation or use. Furthermore, they drape or hang in attractive folds making them equivalent from the ornamentation or esthetic viewpoint to the less useful, from a heat barrier viewpoint, draperies available heretofore.

The subject matter sought to be protected on the foregoing disclosure is defined by the following claims.

I claim:
1. A decorative drapery which can be drawn across a building opening to provide an efficient thermal barrier which comprises:
(A) flexible thermal barrier laminated sheet material consisting essentially of:
(a) a front layer of flexible non-fibrous plastic film about 1 to 20 mils in thickness, said layer having a decorative exposed surface,
(b) an intermediate layer having a thickness about 2.5 to 500 times the thickness of said front layer said intermediate layer thickness being between about 10 to 500 mils, said intermediate layer consisting of resilient flexible foam material,
(c) a back layer of flexible, non-fibrous plastic film about 1 to 20 mils in thickness and
(d) adhesive material between said layers uniting them into a flexible laminated sheet,
(B) the edges of said drapery being heat sealed, and
(C) heat sealed portions adjacent the top edge of said drapery forming support rod receiving means for hanging the drapery.

2. A drapery as claimed in claim 1 wherein said intermediate layer is formed of polyurethane foam.

3. A drapery as claimed in claim 1 wherein said front layer has ornamental printing on its exposed surface.

4. A drapery as claimed in claim 1 wherein the edges of said heat barrier sheet material are heat sealed.

5. A decorative window drapery which can be drawn across a window to provide an efficient barrier against heat transfer through the window which comprises:
(A) flexible heat barrier laminated sheet material consisting of:
(a) a front layer of flexible non-fibrous plastic film about 1 to 20 mils in thickness, said layer having decorative printing upon its exposed surface,
(b) an intermediate layer of flexible polyurethane foam about 10 to 500 mils in thickness, and
(c) a back layer of flexible, non-fibrous plastic film about 1 to 20 mils in thickness comprising between 1 to 10% by weight of heat reflective aluminum metal pigment,
(d) adhesive material between said layers uniting them into a lamination,
(B) the edges of said drapery being heat sealed, and
(C) heat sealed portions adjacent the top edge of said drapery forming support rod receiving means for hanging the drapery.

6. A window drapery as claimed in claim 5 wherein said layers are united in said lamination by vinyl plastisol adhesive applied between said layers.

7. A window drapery as claimed in claim 5 having reinforced edge portions formed by narrow strips of nonfibrous plastic film about 1 to 20 mils in thickness heat sealed to the exposed surface of said back layer.

References Cited
UNITED STATES PATENTS

| | | | |
|---|---|---|---|
| 2,520,613 | 8/1950 | Robertson | 160—330 X |
| 2,533,873 | 12/1950 | Brandvein. | |
| 2,774,421 | 12/1956 | Lion | 160—238 |
| 3,084,738 | 4/1963 | Truesdale | 160—330 |
| 3,126,049 | 3/1964 | Hollands | 160—40 |
| 3,148,726 | 9/1964 | Rothbart | 160—330 X |
| 3,173,826 | 3/1965 | Campbell et al. | |
| 3,186,473 | 6/1965 | Myers et al. | 160—241 X |
| 3,236,290 | 2/1966 | Lueder | 160—241 |
| 3,257,263 | 6/1966 | Miller. | |

DAVID J. WILLIAMOWSKY, *Primary Examiner.*

PHILLIP C. KANNAN, *Assistant Examiner.*